United States Patent [19]

Schalk et al.

[11] 4,438,990

[45] Mar. 27, 1984

[54] SEALING ASSEMBLY FOR A ROLLING BEARING

[75] Inventors: Bartje Schalk, Zeist; Claudio Operti, Nieuwegein; Johan C. Bras, Buurmalsen, all of Netherlands

[73] Assignee: SKF Industrial Tradeing & Development Co. B.V., Nieuwegein, Netherlands

[21] Appl. No.: 446,397

[22] Filed: Dec. 2, 1982

[30] Foreign Application Priority Data

Dec. 17, 1981 [NL] Netherlands .......................... 8105701

[51] Int. Cl.³ ........................ F16C 33/76; F16J 15/447
[52] U.S. Cl. .................................. 308/187.1; 277/40; 277/53
[58] Field of Search ................... 308/187, 187.1, 187.2; 384/147, 140, 144, 135; 277/67, 96.2, 88, 68, 89, 69, 91, 92, 25, DIG. 4, 38, 53, 39, 40, 41, 42, 43

[56] References Cited

U.S. PATENT DOCUMENTS

| | | | |
|---|---|---|---|
| 1,978,739 | 10/1934 | Brittain, Jr. ................... | 308/187.1 X |
| 2,210,543 | 8/1940 | Cox ................................... | 308/187.1 |
| 3,101,954 | 8/1963 | Huddle .......................... | 308/187.1 X |
| 3,245,735 | 4/1966 | Sikora ............................. | 308/187.1 |
| 3,527,512 | 9/1970 | Miller ........................... | 308/187.1 X |

Primary Examiner—Stuart S. Levy
Assistant Examiner—David Werner

Attorney, Agent, or Firm—Eugene E. Renz, Jr.

[57] ABSTRACT

Seal assembly for a rolling bearing assembly having an inner race ring (5) adapted to be mounted on a shaft member (18) and an outer race ring (4) radially spaced from the inner race ring (5) defining an annular space for rolling elements (16) comprising a contoured sealing ring (1) connected to the outer race ring (4) cooperatively associated with a closure member (2) mounted on the shaft member adjacent one axial end of said inner race ring (5) to seal the annular space at least at one axial end of the rolling bearing assembly, said sealing ring (1) having an outer portion (3) connected to the outer race ring (4) inner and outer axially directed annular wall portions (7, 10) connected by an intermediate wall portion (8) and spaced apart radially to define an enlarged chamber overlying and spaced radially outwardly of said closure member (2) annular lubricant chamber (13), said closure member comprising an annular body portion (2a) and an axially outwardly directed flange portion (14) spaced radially from the body portion (2a) and defining a pocket (6) within which the terminal portion of the inner annular wall portion (7) extends, the inner annular wall portion (7) being contoured to complement the contoured face of the body portion which has angularly disposed wall segments (11 and 12) generally parallel to and spaced from wall portions (8) and (9) of the sealing ring and closely spaced therefrom to define a serpentine labyrinthian passage.

4 Claims, 1 Drawing Figure

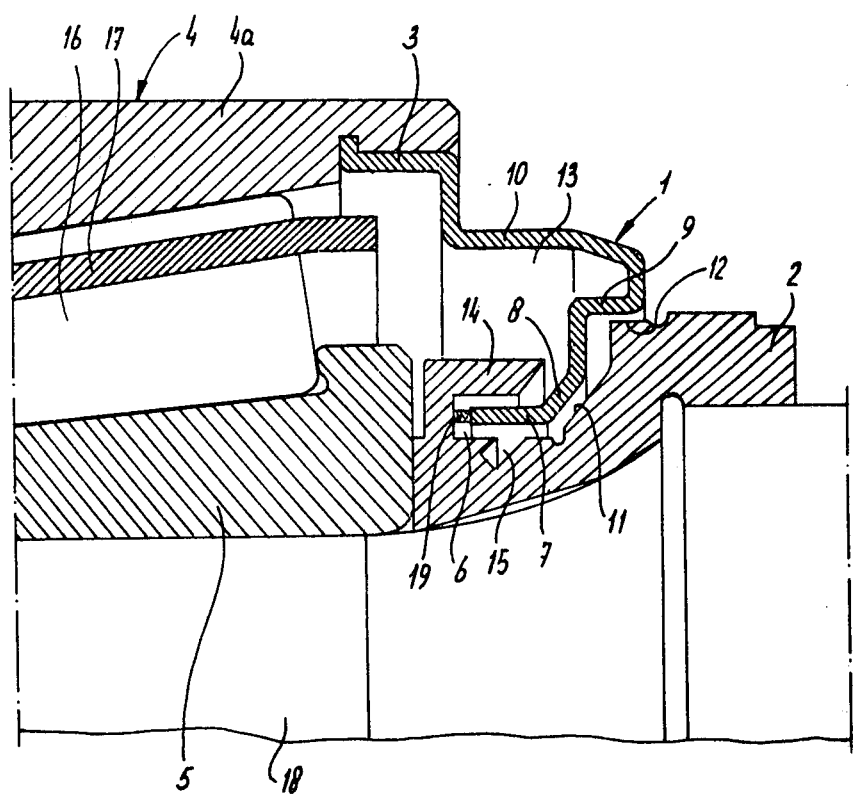

SEALING ASSEMBLY FOR A ROLLING BEARING

BACKGROUND OF THE INVENTION

1. Field of the Invention

The invention relates to a sealing assembly for a rolling bearing, in particular a high-speed rolling bearing.

Such a sealing assembly serves to hold a quantity of lubricant inside the bearing, usually in the form of grease, and to prevent entry of dirt into the bearing from the outside.

2. Description of the Prior Art

Hitherto, such sealing assemblies have comprised a felt ring arranged in a recess extending radially in a part connected to the outer race of the bearing, or integral therewith, for example an outer race or bearing housing, which ring is in contact with a part connected to the inner race, or integral therewith, whether or not in combination with a labyrinth seal extending radially.

In application to a rolling bearing for high rotational speeds, for example in a bearing for mounting the axles of high speed trains, which may run at over 1000 rpm, the sliding contact of the stationary felt ring with the rotating part of the inner race generates a great deal of heat, which is a very serious disadvantage, meaning that the service life of such a bearing is much shortened.

SUMMARY OF THE INVENTION

The object of the invention is to provide a sealing assembly for a rolling bearing, in particular for high speeds, in which no felt ring is present, yet a very good sealing effect is achieved at axle speeds of more than 1000 rpm.

This object is accomplished in that the sealing assembly according to the invention consists principally of an annularly contoured sealing member, one extremity of which, situated along the outer periphery, may be connected to the outer race of a roller bearing, and a closure member cooperating therewith, capable of being connected to the inner race, while, in assembled condition, the other free extremity, extending along the inner periphery of the sealing ring, is axially directed and projects with clearances on all sides into a revolving recess extending axially inward in the closure member, and the said axially extending extremity is connected to the said one extremity by way of a connecting portion generally extending radially and intermediate portions, which portions, together with an outward-directed cylindrical surface of the closure member, extending coaxially with the outer peripheral wall of the revolving recess, enclose an annular chamber, the innermost peripheral wall of which is formed by the said cylindrical surface, which chamber is in communication with the surroundings only by way of the clearances between the axially extending extremity of the sealing ring and the walls of the recess.

Owing to the presence of the lowermost cylindrical boundary surface, formed in the closure member, of the chamber, in which a quantity of lubricant is trapped, a centrifugal force directed radially outward is exerted on the lubricant in the chamber as the inner race of the bearing rotates, whereby the lubricant is spun off outward away from the clearances communicating with the surroundings, so that the lubricant is effectively retained in the said chamber, while the slits extending predominantly in axial direction effectively prevent entry of dirt into the space from the outside.

Advantageously the connecting portion of the sealing ring generally extending radially may pass over into an axially extending intermediate portion, and the innermost peripheral wall, reckoning in radial direction, of the recess, may pass over into a wall portion extending parallel to said connecting portion at a distance, which wall portion in turn passes over into a wall portion extending axially at a distance parallel to the said axially extending intermediate portion of the sealing ring.

In this way, essentially the axially extending slits are lengthened, whereby the dirt is kept back still better, while the chamber is enlarged so that it can hold more lubricant.

In the innermost peripheral wall of the recess, an annular groove generally directed radially may be arranged. This groove forms a lubricant reservoir that can be drawn upon to replace lubricant unavoidably leaking to the outside through the slits, so that effective lubricant will be longer retained inside the chamber. A steady, extremely slight outward flow of lubricant through the slits is desirable because it positively prevents entry of dirt into the bearing.

Preferably the connecting portion of the sealing ring generally extending radially extends from the axially extending extremity thereof obliquely outward, facilitating assembly of the sealing ring and closure member.

Advantageously, between the top of the axially extending extremity of the sealing member and the bottom of the annular recess in the closure member, a piece of self-lubricating or similar material may be arranged still further improving the seal.

BRIEF DESCRIPTION OF THE DRAWING

The invention will be described in more detail with reference to the drawing, in which a portion of a sealing assembly according to the invention is shown arranged on a roller bearing in axial section.

DESCRIPTION OF THE PREFERRED EMBODIMENTS

As shown in the drawing, the sealing assembly comprises a sealing ring 1 and a closure member 2 cooperating therewith.

The extremity 3 extending along the outer periphery of the sealing ring 1 is fixed in the outer race 4a of the bearing 4, while the closure member 2 is connected to the inner race 5 of the bearing.

In the closure member 2, an annular recess 6 is formed, into which the axially directed extremity 7 extending along the inner periphery of the sealing ring 1 projects with clearance on all sides. The axially directed extremity 7 passes over into a connecting portion 8 generally directed radially, which in turn passes over into an axially directed intermediate portion 9, connected by intermediate portion 10 with extremity 3. The innermost peripheral wall of the recess 6 passes over into a wall portion 11 extending parallel to the connecting portion 8 at a distance, and the said wall portion in turn passes over into a wall portion 12 extending parallel to the axial intermediate portion 9 at a distance.

The sealing ring 1 and closure member 2 enclose a chamber 13, in which lubricant is trapped during service. The innermost wall of the chamber 13 is formed by the cylindrical surface 14 of the closure member 2, so that upon rotation of the inner race 5 and hence of the closure member 2, a centrifugal force is exerted on the lubricant inside the chamber 13, whereby said lubricant in chamber 13 is spun off outward away from the communication of chamber 13 with the surroundings, which communication is established by the contoured slit consisting of the clearance all around between the axially extending portion 7 and the recess 6, the clearance between the connecting portion 8 and the wall portion 11, and the clearance between the axially extending intermediate portion 9 and the wall portion 12. This contoured slit, consisting of portions predominantly extending axially, effectively prevents dirt from entering the chamber 13 from the outside and thence entering the bearing.

In the innermost peripheral wall of the recess 6, a groove 15 is arranged, serving as a lubricant reservoir to make up lubricant escaping unavoidably but in extremely small amounts through the slit to the outside, so that effective lubricant in chamber 13 remains wholly inside said chamber for a longer period of time.

Likewise shown are rollers 16 with cage 17 and the shaft 18 on which the inner race 5 is fixed.

Between the end of the axially projecting extremity 7 of the sealing ring 1 and the bottom of the annular recess 6, a ring or packing 19 of self-lubricating material may readily be arranged, thereby optimizing the seal, because the frictional resistance is very low.

What is claimed is:

1. Seal assembly for a rolling bearing assembly having an inner race ring (5) adapted to be mounted on a shaft member (18) and an outer race ring (4) radially spaced from the inner race ring (5) defining an annular space for rolling elements (16) comprising a contoured sealing ring (1) connected to the outer race ring (4) cooperatively associated with a closure member (2) mounted on the shaft member adjacent one axial end of said inner race ring (5) to seal the annular space at least at one axial end of the rolling bearing assembly, said sealing ring (1) having an outer portion (3) connected to the outer race ring (4) inner and outer axially directed annular wall portions (7, 10) connected by an intermediate wall portion (8) and spaced apart radially to define an enlarged chamber overlying and spaced radially outwardly of said closure member (2) annular lubricant chamber (13), said closure member comprising an annular body portion (2a) and an axially outwardly directed flange portion (14) spaced radially from the body portion (2a) and defining a pocket (6) within which the terminal portion of the inner annular wall portion (7) extends, the inner annular wall portion (7) being contoured to complement the contoured face of the body portion which has angularly disposed wall segments (11 and 12) generally parallel to and spaced from wall portions (8) and (9) of the sealing ring and closely spaced therefrom to define a serpentine labyrinthian passage having an inlet and communicating with the chamber (13) disposed radially inwardly of an outlet and communicating with the ambient atmosphere, the flange (14) defining the innermost axially extending wall of said lubricant chamber (13) whereby upon relative rotation of said inner and outer race rings and said sealing ring (1) and closure member (2) a centrifugal force is exerted on lubricant in said chamber (13) urging the lubricant radially outwardly away from said labyrinthian passage thereby minimizing escape of lubricant therethrough and means defining an annular groove (15) in the innermost wall of said body portion defining said pocket (6) serving as an auxiliary lubricant reservoir.

2. Seal assembly as claimed in claim 1 wherein said annular groove (15) is generally radially directed and is located in the innermost peripheral wall of the said recess (6).

3. A seal assembly as claimed in claim 1 wherein said connecting portion (8) of said sealing ring is frustoconical and extends obliquely outwardly from the axially extending extremity (7).

4. A seal assembly as claimed in claim 1 including an annular member (19) or a plug of self-lubricating material mounted in the outer terminal edge of the axially projecting portion (7) of said sealing ring (1) and engages a wall of said recess (6) of said closure member (2).

* * * * *